United States Patent
Liu et al.

(10) Patent No.: US 10,497,915 B2
(45) Date of Patent: Dec. 3, 2019

(54) BATTERY STRUCTURE, ELECTRONIC DEVICE AND MANUFACTURING METHOD OF BATTERY STRUCTURE

(71) Applicant: HTC Corporation, Taoyuan County (TW)

(72) Inventors: Wan-Hsieh Liu, Taoyuan County (TW); Shu-Feng Lin, Taoyuan County (TW); Chih-Kai Hu, Taoyuan County (TW); Yung-Ling Chou, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 908 days.

(21) Appl. No.: 14/325,380

(22) Filed: Jul. 8, 2014

(65) Prior Publication Data

US 2015/0064528 A1  Mar. 5, 2015

Related U.S. Application Data

(60) Provisional application No. 61/871,329, filed on Aug. 29, 2013.

(51) Int. Cl.
*H01M 2/16* (2006.01)
*H01M 10/04* (2006.01)
(Continued)

(52) U.S. Cl.
CPC .......... *H01M 2/1673* (2013.01); *H01M 6/46* (2013.01); *H01M 10/0436* (2013.01);
(Continued)

(58) Field of Classification Search
None
See application file for complete search history.

(56) References Cited

U.S. PATENT DOCUMENTS 6,224,995 B1  5/2001 Fauteux et al.
6,403,252 B1  6/2002 Chiang et al.
(Continued)

FOREIGN PATENT DOCUMENTS

CN   101431168   5/2009
CN   201904405   7/2011
(Continued)

OTHER PUBLICATIONS

"Office Action of German Counterpart Application", dated Aug. 18, 2015, p. 1-p. 4, in which the listed references were cited.
(Continued)

*Primary Examiner* — Robert S Carrico
(74) *Attorney, Agent, or Firm* — JCIPRNET

(57) ABSTRACT

A battery structure including a first battery unit, a second battery unit, a separation membrane and a packing is provided. The first and the second battery units respectively include at least one anode, at least one cathode and a dielectric layer located between the at least one anode and the at least one cathode close to each other. The at least one anode and the at least one cathode are alternately stacked with each other. The second battery unit is stacked on the first battery unit. A dimension of the first battery unit is smaller than that of the second battery unit. The separation membrane is disposed between the first and the second battery units. The packing covers the first and the second battery units and the separation membrane. An electronic device including the battery structure, and a manufacturing method of the battery structure, are further provided.

10 Claims, 9 Drawing Sheets

(51) Int. Cl.
  *H01M 6/46*   (2006.01)
  *H01M 2/02*   (2006.01)
(52) U.S. Cl.
  CPC .. *H01M 10/049* (2013.01); *H01M 2002/0205* (2013.01); *H01M 2220/30* (2013.01)

(56) References Cited

U.S. PATENT DOCUMENTS

| | | | | |
|---|---|---|---|---|
| 6,610,443 | B2* | 8/2003 | Paulot | H01M 2/0202 429/175 |
| 7,049,028 | B2 | 5/2006 | Notten et al. | |
| 7,794,873 | B2 | 9/2010 | Mino et al. | |
| 8,293,391 | B2 | 10/2012 | Kawase | |
| 8,345,420 | B2 | 1/2013 | McClure et al. | |
| 2001/0005561 | A1* | 6/2001 | Yamada | H01M 2/1066 429/152 |
| 2013/0108906 | A1 | 5/2013 | Bhardwaj et al. | |
| 2013/0136967 | A1 | 5/2013 | Bhardwaj et al. | |
| 2014/0050958 | A1* | 2/2014 | Kwon | H01M 10/0583 429/94 |
| 2014/0120394 | A1* | 5/2014 | Kwon | H01M 10/0463 429/94 |

FOREIGN PATENT DOCUMENTS

| | | |
|---|---|---|
| CN | 202217736 | 5/2012 |
| CN | 102884665 | 1/2013 |
| DE | 102012101407 | 8/2012 |
| DE | 102013200588 | 7/2013 |
| TW | 469660 | 12/2001 |
| TW | 494593 | 7/2002 |
| TW | 499767 | 8/2002 |
| TW | 200743245 | 11/2007 |
| TW | 200812138 | 3/2008 |
| TW | I313079 | 8/2009 |
| TW | I344234 | 6/2011 |
| WO | 2006025662 | 3/2006 |

OTHER PUBLICATIONS

"Notice of Allowance of Taiwan Counterpart Application," dated May 4, 2015, p. 1-p. 6, in which the listed references were cited.
"Office Action of China Counterpart Application", dated Apr. 6, 2016, p. 1-p. 7, in which the listed references were cited.
"Office Action of China Counterpart Application," dated Apr. 26, 2019, p. 1-p. 6.

* cited by examiner

BATTERY STRUCTURE, ELECTRONIC DEVICE AND MANUFACTURING METHOD OF BATTERY STRUCTURE

CROSS-REFERENCE TO RELATED APPLICATION

This application claims the priority benefits of U.S. provisional application Ser. No. 61/871,329, filed on Aug. 29, 2013. The entirety of the above-mentioned patent application is hereby incorporated by reference herein and made a part of this specification.

BACKGROUND OF THE APPLICATION

1. Field of the Application

The application generally relates to a battery structure, an electronic device and a manufacturing method of the battery structure.

2. Description of Related Art

Currently, as technology advances, electronic devices, such as mobile phone, tablet PC and so forth, tend to develop towards being light, thin, short and compact in sizes. Therefore, each component within the electronic device is severely restricted in terms dimension. Taking the mobile phone for an instance, a casing thereof is usually designed with a curvature so as to facilitate a user in gripping the casing; however, due to a shape of a battery structure generally being rectangular, when the battery structure is installed within the electronic device, spaces between the battery structure and the arc-shaped casing will be wasted, thereby causing difficulty in reducing the dimension of the electronic device.

SUMMARY OF THE APPLICATION

The application is directed to a battery structure having a non-square appearance, such as stepped or arc shape, at partial region.

The application is directed to an electronic device adopting the said battery structure for enhancing a utilization rate of an interior space of the electronic device.

The application is directed to a manufacturing method of a battery structure capable of manufacturing the said battery structure.

A battery structure of the application includes a first battery unit, a second battery unit, a separation membrane and a packing. The first battery unit includes at least one anode and at least one cathode alternately stacked with each other and a dielectric layer located between the at least one anode and the at least one cathode close to each other. The second battery unit is stacked on the first battery unit, the second battery unit includes at least one anode and at least one cathode alternately stacked with each other and a dielectric layer located between the at least one anode and the at least one cathode close to each other, and a dimension of the first battery unit is smaller than a dimension of the second battery unit. The separation membrane is disposed between the first battery unit and the second battery unit. The packing covers the first battery unit, the second battery unit and the separation membrane.

An electronic device of the application includes a casing and a battery structure. The casing has an interior space. The battery structure is disposed in the interior space. The battery structure includes a first battery unit, a second battery unit, a separation membrane and a packing. The first battery unit includes at least one anode and at least one cathode alternately stacked with each other and a dielectric layer located between the at least one anode and the at least one cathode close to each other. The second battery unit is stacked on the first battery unit, the second battery unit includes at least one anode and at least one cathode alternately stacked with each other and a dielectric layer located between the at least one anode and the at least one cathode close to each other, and a dimension of the first battery unit is smaller than a dimension of the second battery unit. The separation membrane is disposed between the first battery unit and the second battery unit. The packing covers the first battery unit, the second battery unit and the separation membrane.

A manufacturing method of a battery structure of the application includes the following steps. A packing is provided, wherein the packing pre-forms an accommodating space. A first battery unit is disposed into the accommodating space, wherein the first battery unit includes at least one anode and at least one cathode alternately stacked with each other and a dielectric layer located between the at least one anode and the at least one cathode close to each other. A second battery unit is stacked on the first battery unit along an axis, wherein the second battery unit is located in the accommodating space, the second battery unit includes at least one anode and at least one cathode alternately stacked with each other and a dielectric layer located between the at least one anode and the at least one cathode close to each other, and a dimension of the first battery unit is smaller than a dimension of the second battery unit. Electrolytes are injected into the accommodating space. The packing is sealed.

In view of the above, the application provides the appearance of the battery structure with variability through adopting the design of staggering different dimensions of the first battery unit and the second battery unit with each other, and when the battery structure is applied to the electronic device with non-square casing, the interior space of the electronic device may fully be utilized. Moreover, in terms of manufacturing, through pre-forming the packing, the first battery unit and the second battery unit may easily maintain their relative positions, thereby effectively lowering the difficulty in processing.

To make the aforementioned and other features and advantages of the application more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
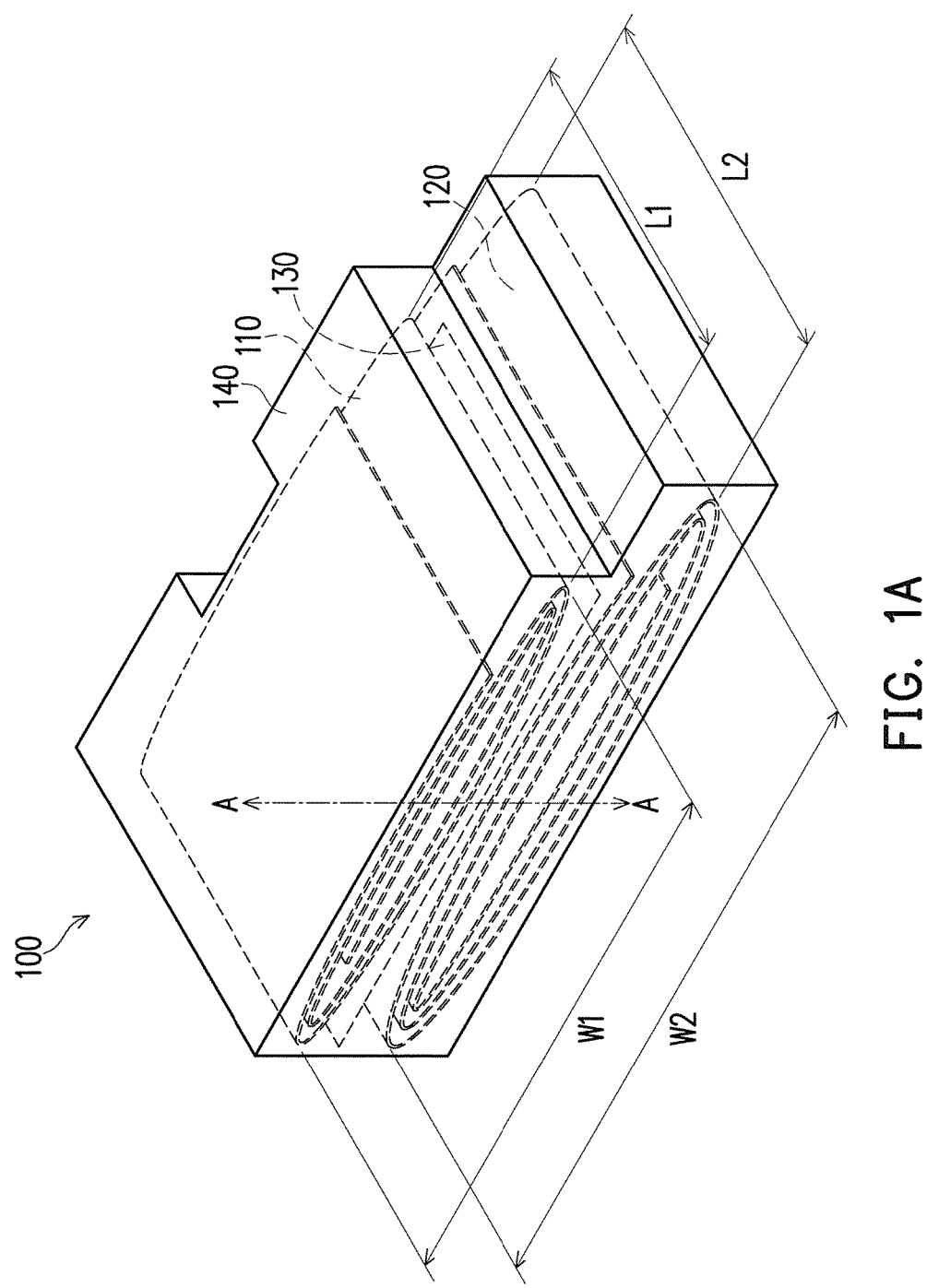
FIG. 1A is a schematic perspective diagram illustrating a battery structure according to an embodiment of the application.
Figure 1B:
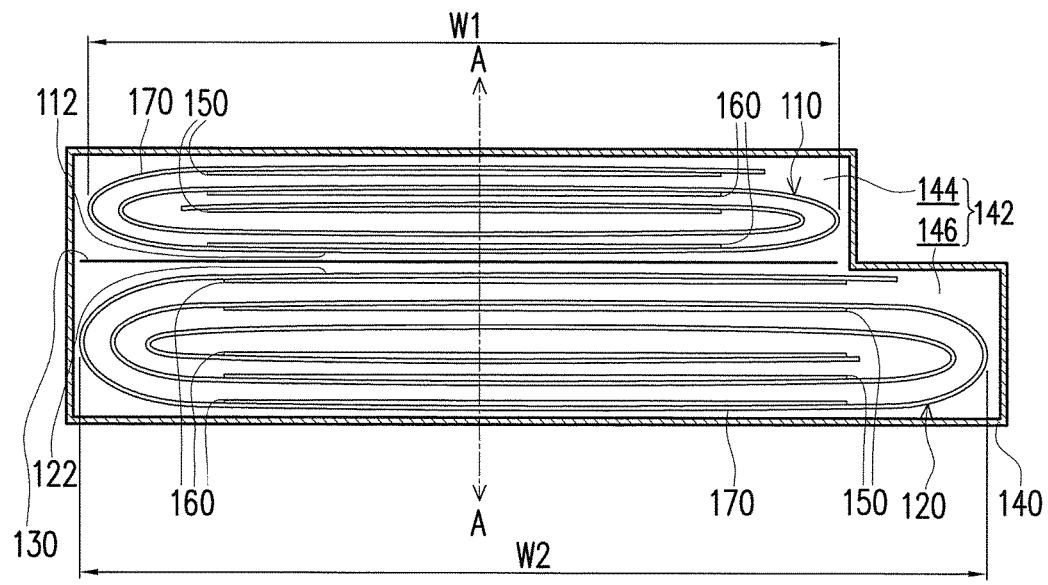
FIG. 1B is a schematic cross-sectional diagram of FIG. 1A.

FIG. 1A is a schematic perspective diagram illustrating a battery structure according to an embodiment of the application. FIG. 1B is a schematic cross-sectional diagram of FIG. 1A. Referring to FIG. 1A and FIG. 1B, a battery structure 100 of the present embodiment includes a first battery unit 110, a second battery unit 120, a separation membrane 130 and a packing 140. The second battery unit 120 is stacked on the first battery unit 110 along an axis A. The separation membrane 130 is disposed between the first battery unit 110 and the second battery unit 120, so as to insulate the first battery unit 110 and the second battery unit 120 from each other.

In the present embodiment, the first battery unit 110 and the second battery unit 120 respectively include a plurality of anodes 150 and a plurality of cathodes 160 that are alternately stacked with each other and the dielectric layers 170 located between any two of the anode 150 and the cathode 160 close to each other. The first battery unit 110 and the second battery unit 120 are respectively spiral wound batteries, but the application is not limited thereto. As shown in FIG. 1A and FIG. 1B, a dimension of the second battery unit 120 is greater than a dimension of the first battery unit 110. In detail, in FIG. 1A and FIG. 1B, a length L2 and a width W2 of the second battery unit 120 are both greater than a length L1 and a width W1 of the first battery unit 110; and the application sets no specific restriction to the heights. In addition, dimensions of the anodes 150 and the cathodes 160 of the first battery unit 110 are smaller than dimensions of the anodes 150 and the cathodes 160 of the second battery unit 120.

It is to be explained that, in order to clearly distinguish the first battery unit 110, the second battery unit 120 and the separation membrane 130 in the figures, the separation membrane 130 is drawn as being spaced a short distance apart from the first battery unit 110 and the second battery unit 120, but in actual practice, the separation membrane 130 would be disposed on the first battery unit 110, and the second battery unit 120 would be disposed on the separation membrane 130, so that two opposite sides of the separation membrane 130 are respectively in contact with the first battery unit 110 and the second battery unit 120. More specifically, in the present embodiment, the separation membrane 130 is only in contact with a first surface 112 of the first battery unit 110 and a second surface 122 of the second battery unit 120, and the first surface 112 faces towards and is insulated from the second surface 122. Moreover, in a preferred embodiment, electrode near to the first surface 112 of the first battery unit 110 is the cathode 160, and electrode near to the second surface 122 of the second battery unit 120 is also the cathode 160; and by means of such disposition, occurrence of a short-circuit may be prevented, but the application is not limited thereto.

In addition, in the present embodiment, the first battery unit 110 and the second battery unit 120 are not fixed on the separation membrane 130. Certainly, in other embodiments, the first battery unit 110 and the second battery unit 120 may also be fixed on the separation membrane 130 by means of adhering and hot sealing, so as to increase an accuracy in alignment, but the application is not limited thereto. The packing 140 covers the first battery unit 110, the second battery unit 120 and the separation membrane 130.

In the present embodiment, the packing 140 is a housing of hard matter, but the type of the packing 140 is not limited thereto, such that in other embodiments, the packing 140 may also be a thin film of soft matter or so forth.

The packing 140 has an accommodating space 142, and the first battery unit 110 and the second battery unit 120 are located in the accommodating space 142. More specifically, the accommodating space 142 has a first region 144 and a second region 146 connected with each other, and a maximum cross-sectional area of the first region 144 transversally cut along the axis A is smaller than a maximum cross-sectional area of the second region 146 transversally cut along the axis A. The first battery unit 110 is located in the first region 144, and the second battery unit 120 is located in the second region 146. A profile of the packing 140 substantially fits profiles of the first battery unit 110 and the second battery unit 120. In other words, partial appearance of the battery structure 100 may present a non-rectangular shape, such as a stepped or arc shape, so as to show the regions on the second battery unit 120 that are not covered by the first battery unit 110, thereby enabling the battery structure 100 to have a more variable appearance for complying with the limited interior space configured within the electronic device.

Figure 1C:
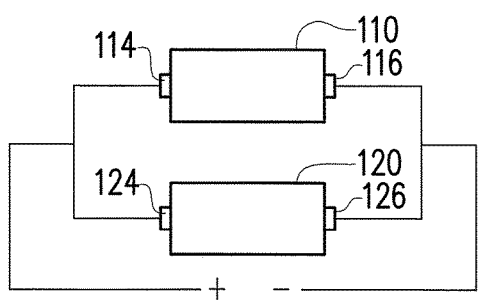
FIG. 1C is a schematic circuit diagram of the battery structure in FIG. 1A.

In the present embodiment, the first battery unit 110 and the second battery unit 120 are physically insulated from each other, and are only electrically connected with each other through the positive contacts 114, 124 and the negative contacts 116, 126. In detail, FIG. 1C is a schematic circuit diagram of the battery structure in FIG. 1A. Referring to FIG. 1C, the first battery unit 110 and the second battery unit 120 respectively have a pair of contacts or pads (e.g., nickel pads) for external connection. Specifically, in the present embodiment, the first battery unit 110 has a positive contact 114 and a negative contact 116, and the second battery unit 120 has a positive contact 124 and a negative contact 126. The positive contact 114 of the first battery unit 110 after being electrically connected with the positive contact 124 of the second battery unit 120, and the negative contact 116 of the first battery unit 110 after being electrically connected with the negative contact 126 of the second battery unit 120, are then electrically connected to the outside, respectively.

Figure 2:
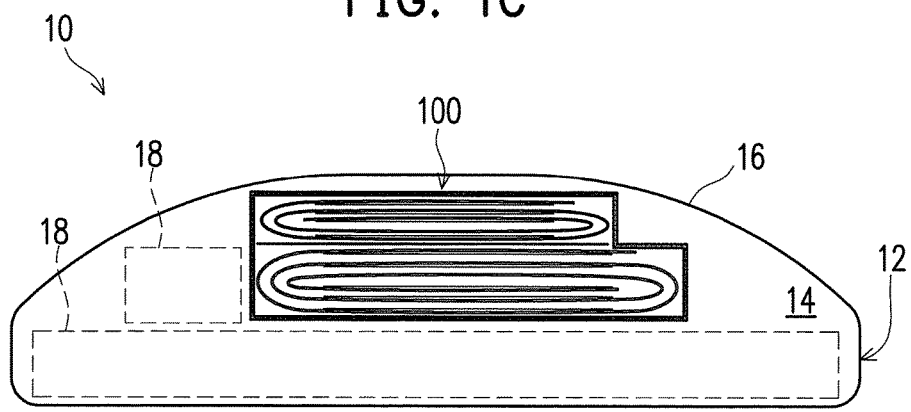
FIG. 2 is a schematic cross-sectional diagram illustrating an electronic device according to an embodiment of the application.

FIG. 2 is a schematic cross-sectional diagram illustrating an electronic device according to an embodiment of the application. Referring to FIG. 2, the electronic device 10 of the present embodiment includes a casing 12 and the battery structure 100. The casing 12 has an interior space 14. As shown in FIG. 2, the casing 12 has an arc surface 16, and thus causes the interior space 14 to be non-square. Since the battery structure 100 may present a stepped or arc shape appearance, the shape of the battery structure 100 may be designed according to a shape of a region remained after the interior space 14 of the electronic device 10 has accommodated a required element 18 (such as a circuit board, a speaker, a lens, and so forth), so that the required element 18 and the battery structure 100 may both be accommodated in the limited interior space 14. In the present embodiment, the battery structure 100 is disposed in a region of the interior space 14 that is close to the arc surface 16, and by designing the stepped surface of the battery structure 100 to substantially fit a profile of the arc surface 16, a waste in the interior space 14 is lowered.

Figure 3A:
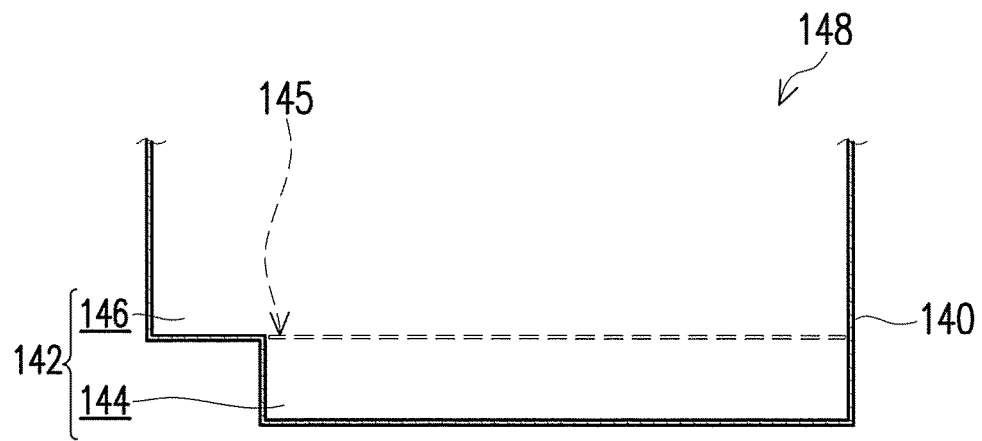
FIG. 3A through FIG. 3D are schematic diagram illustrating a manufacturing process of the battery structure in FIG. 1A.

The following further introduces a manufacturing method of the battery structure 100 in FIG. 1A. FIG. 3A through FIG. 3D are schematic diagram illustrating the manufacturing process of the battery structure in FIG. 1A. Firstly, as shown in FIG. 3A, the packing 140 is provided. In the present embodiment, the packing 140 is pre-formed with an accommodating space 142 and an entrance 148 connected to the accommodating space 142. The accommodating space 142 has a first region 144 and a second region 146 connected with each other. The first region 144 is away from the entrance 148, the second region 146 is close to the entrance 148, and a port 145 is formed at a junction between the first region 144 and the second region 146. An orthogonal projection of the first region 144 on the port 145 is smaller than an orthogonal projection of the second region 146 on the port 145. In other words, a maximum horizontal cross-sectional area of the first region 144 is smaller than a maximum horizontal cross-sectional area of the second region 146. A design may determine the dimensions of the first region 144 and the second region 146 based on the dimensions of the first battery unit 110 and the second battery unit 120 that are to be placed into the accommodating space 142, so as to avoid a waste of the accommodating space 142.

Figure 3B:
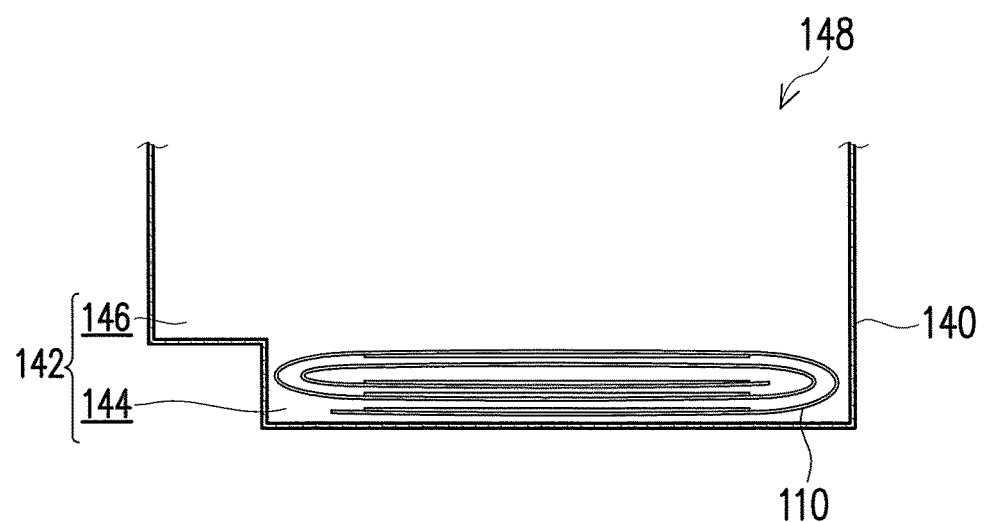
Figure 3C:
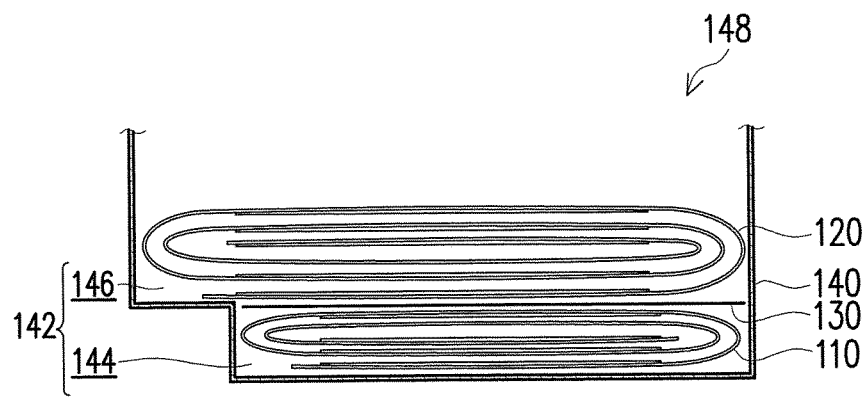

Next, as shown in FIG. 3B and FIG. 3C, the first battery unit 110, the separation membrane 130 and the second battery unit 120 are sequentially placed into the accommodating space 142 via the entrance 148. In the present embodiment, the first battery unit 110 is located in the first region 144, and the second battery unit 120 is located in the second region 146. Since the packing 140 is pre-formed into a specific shape, the first battery unit 110 and the second battery unit 120 may maintain their relative positions after being placed into the packing 140. Then, electrolyte is injected to the accommodating space 142 to immerse the first battery unit 110 and the second battery unit 120 in the electrolytes.

Figure 3D:
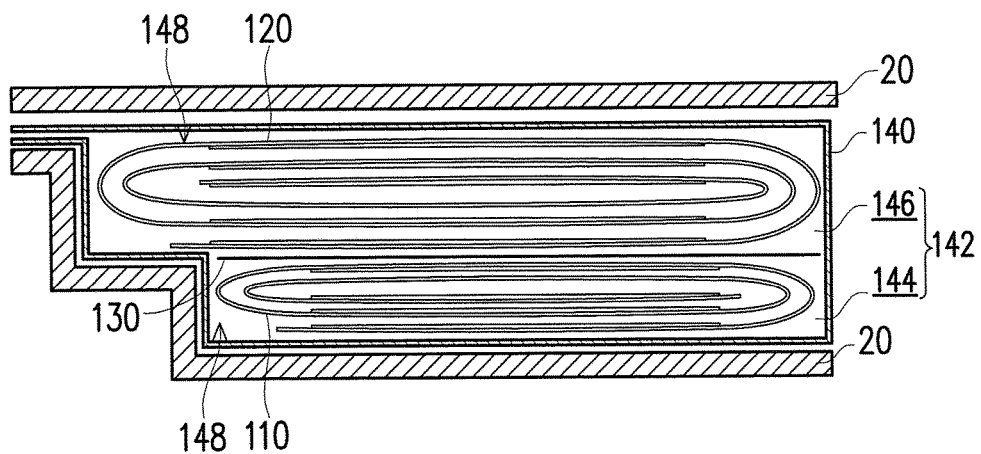

Next, as shown in FIG. 3D, the packing 140 at a region close to the entrance 148 is being shut, and a forming mold 20 performs a hot sealing on the packing 140 for the first time. A shape of the forming mold 20 is substantially a predetermined final outer appearance of the battery structure 100. After this step, the battery structure 100 is substantially formed. Then, excess gas and electrolyte are extracted from the accommodating space 142 so as to lower the chance of rupturing the packing due to having too much pressure in the accommodating space 142. Subsequently, the packing 140 is being hot pressed again to be sealed up; and finally, after cutting off an excess portion of the packing 140, the battery structure as shown in FIG. 1A is obtained. Certainly, the above description is only directed to one of the manufacturing methods of the battery structure 100, and the manufacturing method of the battery structure 100 is not limited thereto.

In addition, referring back to FIG. 1A, in the battery structure 100 of FIG. 1A, the first battery unit 110 is stacked on the second battery unit 120; three out of four common sides of the packing 140 at the first battery unit 110 and the second battery unit 120 are flat surfaces, and one, for example, presents a two-stage stepped surface so as to show the regions on the second battery unit 120 not covered by the first battery unit 110; and thus the appearance of the battery structure 100 is variable. However, the appearance of the battery structure 100 and the relative positions between the first battery unit 110 and the second battery unit 120 are not limited to the present embodiment.

Figure 4:
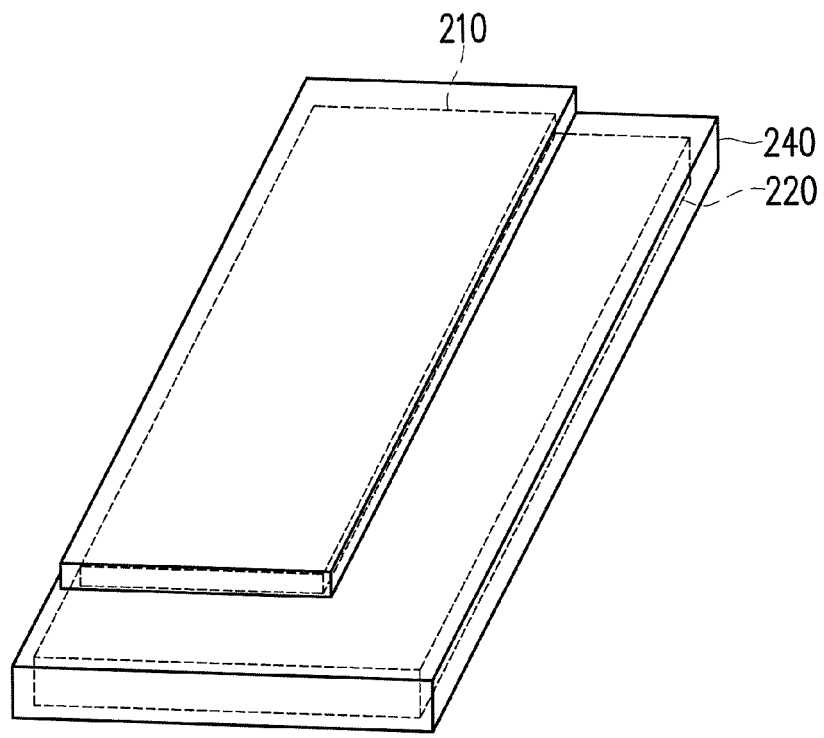
FIG. 4 is a schematic perspective diagram illustrating a battery structure according to another embodiment of the application.

FIG. 4 is a schematic perspective diagram illustrating a battery structure according to another embodiment of the application. Referring to FIG. 4, in FIG. 4, only two out of four common sides of a packing 240 at a first battery unit 210 and a second battery unit 220 are flat surfaces, and the other two are respectively two-stage stepped surfaces. In other words, the first battery unit 210 is stacked on one of the corners of the second battery unit 220.

Figure 5:
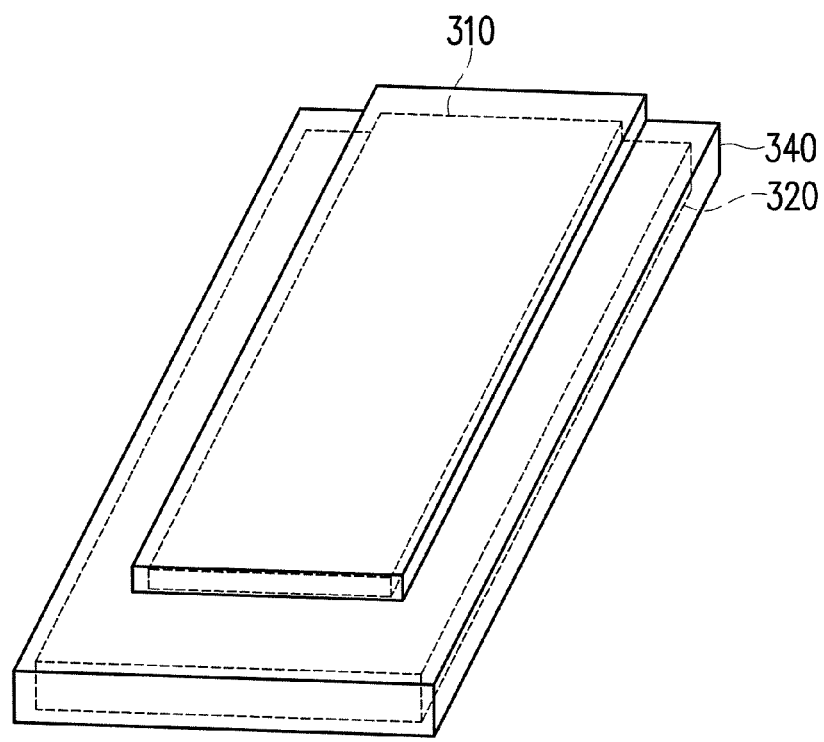
FIG. 5 is a schematic perspective diagram illustrating a battery structure according to another embodiment of the application.

FIG. 5 is a schematic perspective diagram illustrating a battery structure according to another embodiment of the application. Referring to FIG. 5, in FIG. 5, only one out of four common sides of a packing 340 at a first battery unit 310 and a second battery unit 320 is a flat surface, and the other threes are respectively two-stage stepped surfaces. In addition, in another embodiment (not shown), the first battery unit may also be located at a center position of a side of the second battery unit, so that the four common sides of the packing at the first battery unit and the second battery unit may all be two-stage stepped surfaces.

Figure 6:
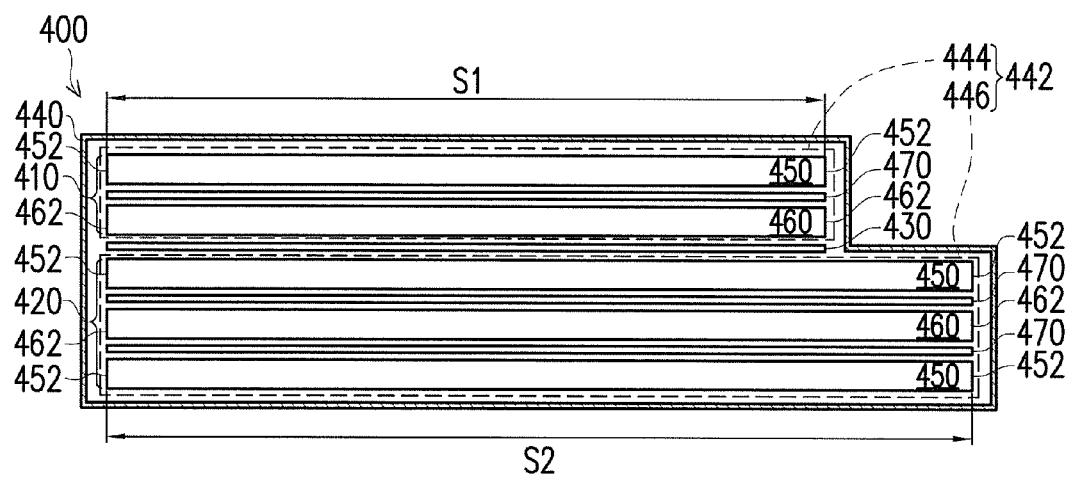
FIG. 6 is a schematic cross-sectional diagram illustrating a battery structure according to another embodiment of the application.

Moreover, the type of the first battery unit and the second battery unit is not limited to the spiral wound battery. FIG. 6 is a schematic cross-sectional diagram illustrating a battery structure according to another embodiment of the application. In the present embodiment, a first battery unit 410 is located in a first region 444 and includes an anode 450, a cathode 460 and a dielectric layer 470 located between the anode 450 and the cathode 460. A second battery unit 420 is located in a second region 446 and includes two anodes 450, a cathode 460 and two dielectric layers 470 respectively located between two of the anode 450 and the cathode 460 close to each other. A separation membrane 430 separates the cathode 460 of the first region 444 from the anode 450 of the second region 446. Materials of the dielectric layer 470 and the separation membrane 430 may be the same or different as long as an insulation effect can be provided.

Noteworthily, since it only requires one anode 450 and one cathode 460 to constitute a battery unit, in the present embodiment, the battery structure 400 also includes a plurality of battery units.

The anodes 450 and the cathodes 460 are plate-shaped and are separated by a plurality of dielectric layers 470, and the anodes 450, the cathodes 460 and the dielectric layers 470 are stacked along the axis A. The anodes 450 and the cathodes 460 respectively include a plurality of sides 452, 462 each with a normal direction perpendicular to the axis A, and the sides 452, 462 are exposed out of the dielectric layers 470. Namely, in the present embodiment, the sides 452, 462 of the anodes 450 and the cathodes 460, unlike the spiral wound batteries, are not shielded by the dielectric layers 470.

In the present embodiment, through designing the first battery unit 410 to have a smaller dimension S1, the second battery unit 420 to have a larger dimension S2, the first battery unit 410 having the smaller dimension and the second battery unit 420 having the larger dimension to be stacked with each other, and the packing 440 to cover the first battery unit 410 and the second battery unit 420 by meaning of substantially fitting the profiles of the first battery unit 410 and the second battery unit 420, the battery structure 400 may have an appearance as shown in FIG. 6, which is in form of large bottom and small top.

Figure 7A:
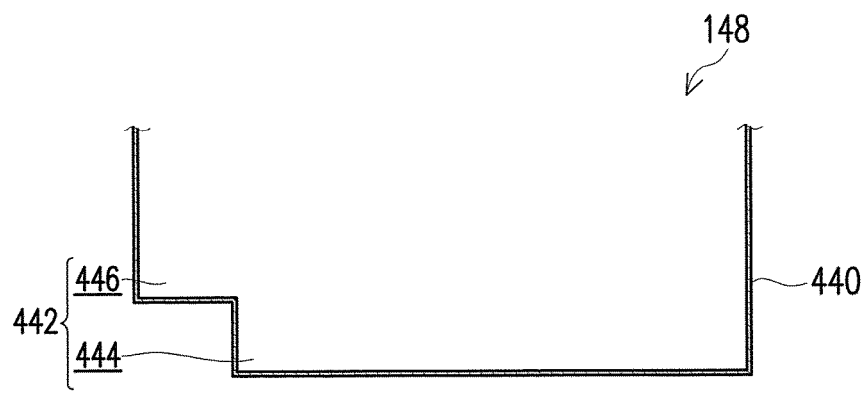
FIG. 7A through FIG. 7D are schematic diagram illustrating a manufacturing process of the battery structure in FIG. 6.
Figure 7B:
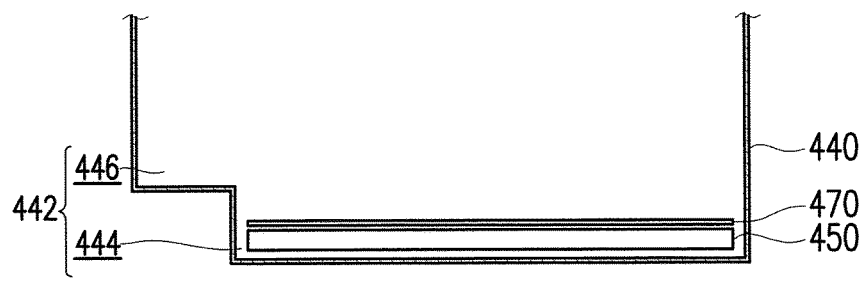
Figure 7C:
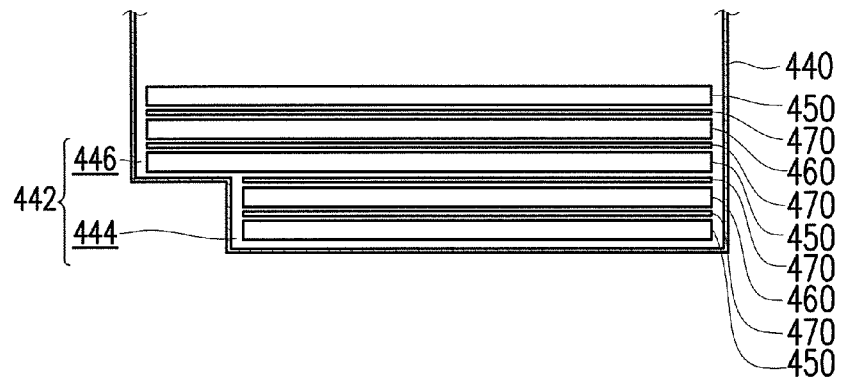
Figure 7D:
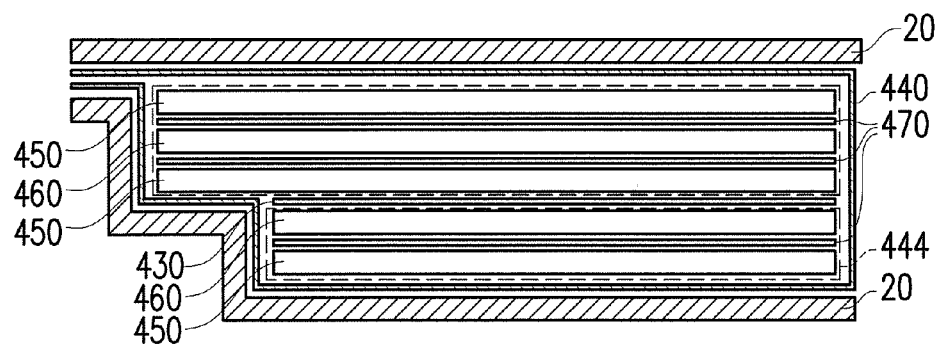

FIG. 7A through FIG. 7D are schematic diagram illustrating a manufacturing process of the battery structure in FIG. 6. A difference between the manufacturing method of the battery structure 100 of FIG. 1A and that of the battery structure 400 of FIG. 6 lies in that, in the packing 440 of FIG. 7A, the dimensions of the first region 44 and the second region 446 pre-formed by the packing 440 are determined based on the dimensions of the anode 450 and the cathode 460 that are to be placed therein. Subsequently, as shown in FIG. 7B and FIG. 7C, an anode 450, a dielectric layer 470 and a cathode 460 having smaller dimensions are firstly being placed, next a separation membrane 430, and then an anode 450, a dielectric layer 470, a cathode 460, a dielectric layer 470, and an anode 450 having larger dimensions are being placed. Finally, the manufacturing method is completed, as shown in FIG. 7D, through performing an initial hot sealing by the forming mold 20, extracting gas and electrolyte, performing the hot sealing again, and cutting excess region of the packing 440.

Noteworthily, amounts of the anode 450 and the cathode 460 in the battery structure 400 are not limited to numbers described in above, such that in other embodiments, the battery structure 400 may also have only one cathode 460 and two anodes 450 of different dimensions, wherein the cathode 460 is located between the two anodes 450, and a dimension of the cathode 460 may be equal to that of one of the anodes 450. In other embodiment, the battery structure 400 may only have one anode 450 and two cathodes 460 of different dimensions, wherein the anode 450 is located between the two cathodes 460, and a dimension of the anode 450 may be equal to that of one of the cathodes 460. As a result, the battery structure 400 may have an appearance in form of large bottom and small top.

Figure 8:
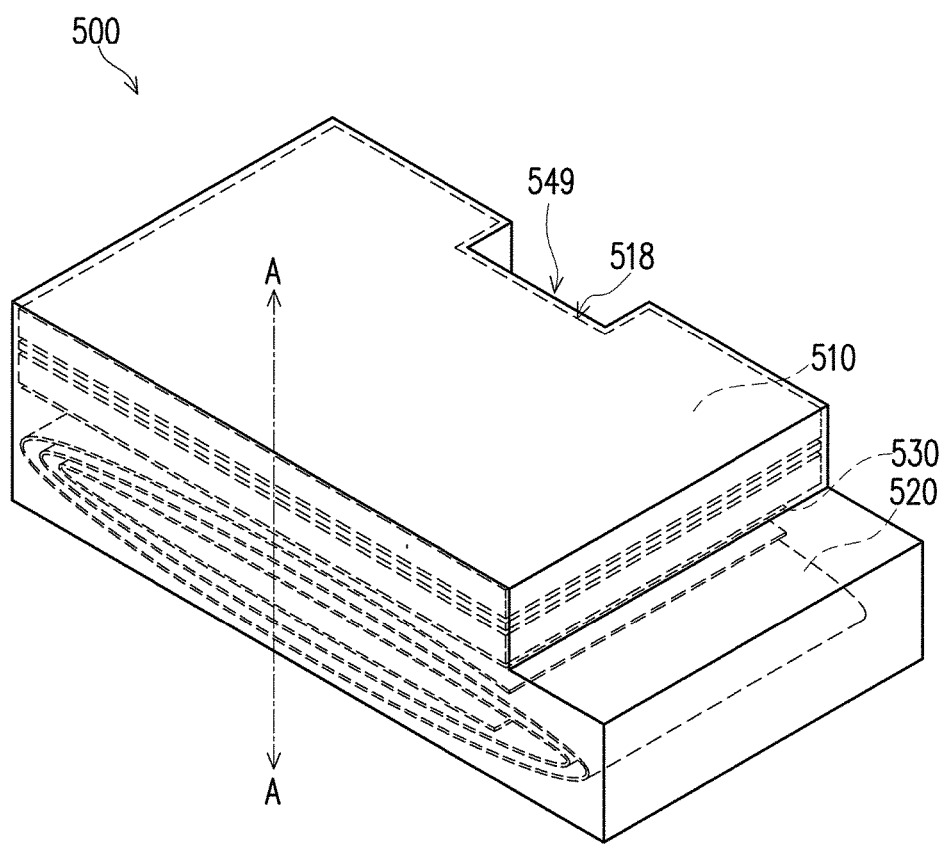
FIG. 8 is a schematic perspective diagram illustrating a battery structure according to another embodiment of the application.

FIG. 8 is a schematic perspective diagram illustrating a battery structure according to another embodiment of the application. Referring to FIG. 8, a battery structure 500 includes a first battery unit 510 and a second battery unit 520 stacked with each other, a separation membrane 530 located between the first battery unit 510 and the second battery unit 520, and a packing 540 covering the first battery unit 510, the second battery unit 520 and the separation membrane 530. In the present embodiment, the first battery unit 510 is a stacked battery, and the second battery unit 520 is a spiral wound battery. The first battery unit 510 has a notch 518; and the packing 540 covers the first battery unit 510 and the second battery unit 520, and also includes a notch 549 at a location corresponding to the notch 518 of the first battery unit 510.

In the present embodiment, in order for the battery structure 500 to fit a limited interior space within an electronic device (not shown) that it is configured in, the battery structure 500 may have a non-rectangular outer appearance, and may have a notch corresponding to a shape of the electronic device. Compared to the spiral wound battery, of which being the first battery unit 110 of the battery structure 100 in FIG. 1A, in the present embodiment, the stacked battery, of which being the first battery unit 510, may also have the same notch 518 for filling up an upper half portion of the packing 540, so that an outer profile of the upper half portion of the packing 540 substantially fits an outer profile of the first battery unit 510. Moreover, in the present embodiment, since the battery structure 500 simultaneously includes the stacked battery and the spiral wound battery, it may have a better flexibility in design.

In summary, the application provides the appearance of the battery structure with variability through adopting the design of staggering different dimensions of the first battery unit and the second battery unit with each other, and when the battery structure is applied to the electronic device with non-square casing, the interior space of the electronic device may fully be utilized. Moreover, in terms of manufacturing, through pre-forming the packing, the first battery unit and the second battery unit may easily maintain their relative positions, thereby effectively lowering the difficulty in processing.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A battery structure, comprising:
a first battery unit comprising at least one anode and at least one cathode alternately stacked with each other and a dielectric layer located between the at least one anode and the at least one cathode close to each other;
a second battery unit stacked on the first battery unit, the second battery unit comprising at least one anode and at least one cathode alternately stacked with each other and a dielectric layer located between the at least one anode and the at least one cathode close to each other, and a dimension of the first battery unit is smaller than a dimension of the second battery unit;
a separation membrane disposed between the first battery unit and the second battery unit; and
a packing covering the first battery unit, the second battery unit and the separation membrane, wherein the package has an accommodating space with dimensions substantially corresponding to the dimensions of the first battery unit, the separation membrane and the second battery unit, so as to accommodate the first battery unit and the second battery unit,
wherein the separation membrane is only in contact with a first surface of the first battery unit and a second surface of the second battery unit, and the first surface faces towards the second surface,
wherein at least one of the first battery unit and the second battery unit is a spiral wound battery, wherein when the first battery unit is the spiral wound battery, the dielectric layer of the first battery unit being the spiral wound battery is folded to wind around the corresponding at least one anode and the corresponding at least one cathode, and the first surface is a part of an outer surface of the dielectric layer, and when the second battery unit is the spiral wound battery, the dielectric layer of the second battery unit being the spiral wound battery is folded to wind around the corresponding at least one anode and the corresponding at least one cathode, and the second surface is a part of an outer surface of the dielectric layer.

2. The battery structure as claimed in claim 1, wherein when one of the first battery unit and the second battery unit is the spiral wound battery, the other one of the first battery unit and the second battery unit is a stacked battery.

3. The battery structure as claimed in claim 2, wherein the stacked battery has a notch or a recess.

4. The battery structure as claimed in claim 2, wherein when the first battery unit is the stacked battery, the at least one anode and the at least one cathode of the first battery unit being the stacked battery are plate-shaped and are separated from each other by the corresponding dielectric layer, and the at least one anode, the at least one cathode and the corresponding dielectric layer of the first battery unit being the stacked battery are stacked along an axis, and when the second battery unit is the stacked battery, the at least one anode and the at least one cathode of the second battery unit being the stacked battery are plate-shaped and are separated from each other by the corresponding dielectric layer, and the at least one anode, the at least one cathode and the corresponding dielectric layer of the second battery unit being the stacked battery are stacked along an axis.

5. The battery structure as claimed in claim 1, wherein the accommodating space has a first region and a second region connected with each other whereby a port is formed between a junction thereof, the first battery unit and the second battery unit are stacked along an axis, and an orthogonal projection of the first region on the port is smaller than an orthogonal projection of the second region on the port.

6. The battery structure as claimed in claim 5, wherein first battery unit is located in the first region, and the second battery unit is located in the second region.

7. The battery structure as claimed in claim 1, wherein a profile of the packing substantially fits profiles of the first battery unit and the second battery unit.

8. The battery structure as claimed in claim 1, is insulated from the second surface, and electrodes near to the first surface and the second surface are cathodes.

9. The battery structure as claimed in claim 1, wherein the first battery unit has at least one contact for external connection, the second battery unit has at least one contact for external connection, the contact of the first battery unit and the contact of the second battery unit are firstly electrically connected to each other and then electrically connected to the outside, and the contact of the first battery unit and the contact of the second battery unit that are connected with each other are simultaneously positive or negative.

10. An electronic device, comprising:
a casing having an interior space; and
a battery structure, as claimed in claim 1, disposed in the interior space.

* * * * *